No. 808,140. PATENTED DEC. 26, 1905.
F. R. CHILDREN.
HAY RAKE.
APPLICATION FILED FEB. 17, 1905.
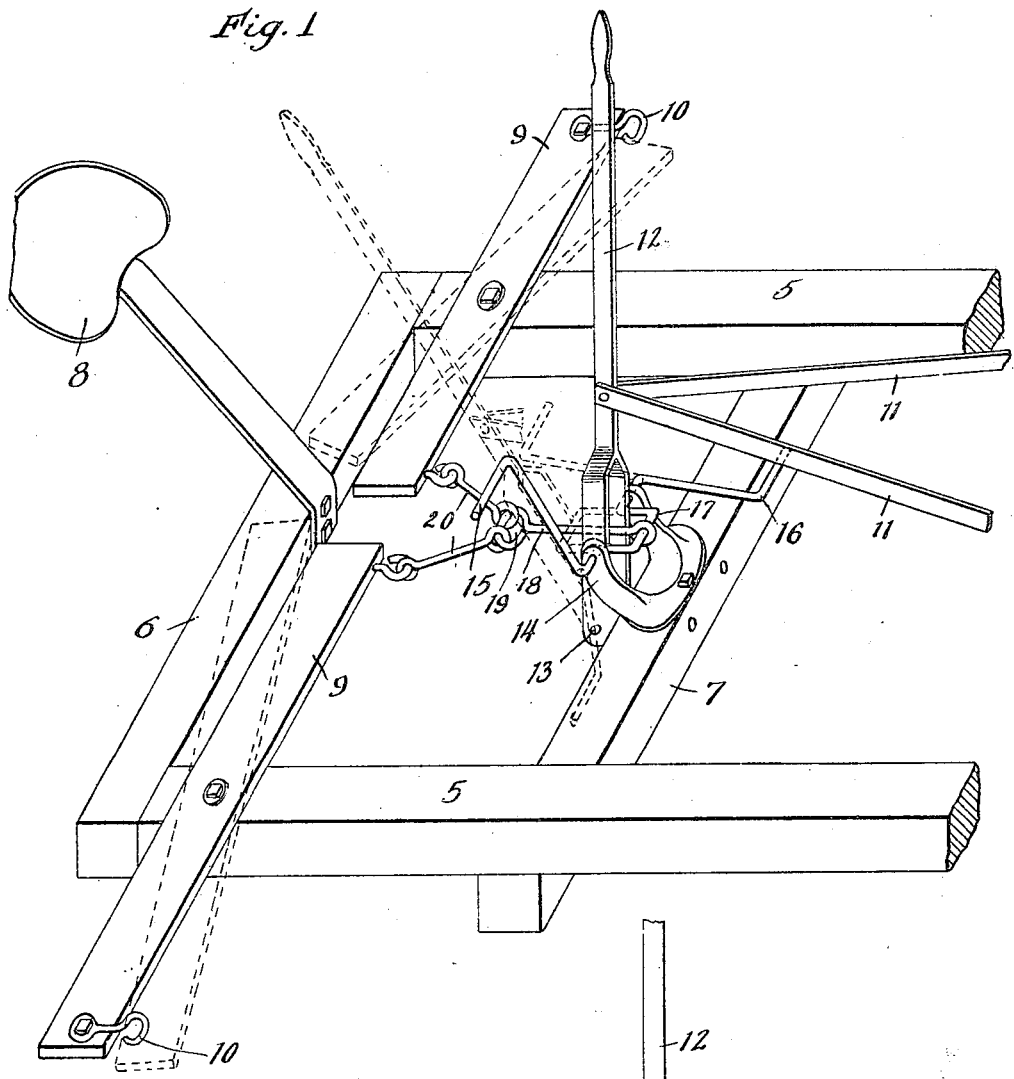
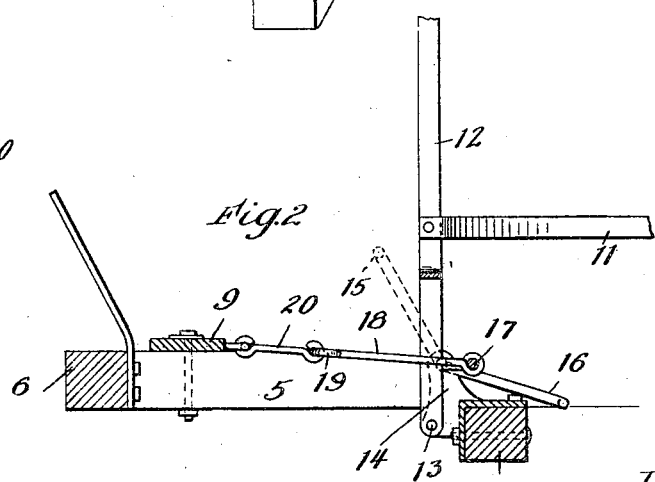
Witnesses:
Wm. Geiger
H. W. Munday
Inventor:
Frank R. Children
By Munday, Evarts & Adcock
Attorneys

UNITED STATES PATENT OFFICE.

FRANK R. CHILDREN, OF COUNCIL BLUFFS, IOWA, ASSIGNOR TO E. CHILDREN'S SONS MANUFACTURING COMPANY, OF COUNCIL BLUFFS, IOWA, A CORPORATION OF IOWA.

HAY-RAKE.

No. 808,140.        Specification of Letters Patent.        Patented Dec. 26, 1905.

Application filed February 17, 1905. Serial No. 246,051.

*To all whom it may concern:*

Be it known that I, FRANK R. CHILDREN, a citizen of the United States, residing in Council Bluffs, in the county of Pottawattamie and State of Iowa, have invented a new and useful Improvement in Hay-Rakes, of which the following is a specification.

This invention is an improvement in that class of hay rakes or gatherers of the kind commonly known as "power-lift push-rakes," in which the rake-head is arranged in front of the horses.

My main object in the invention is to provide a construction by which the draft devices may be held from all connection to or contact with the lifting lever or device during the raking, thereby permitting the teeth to be raised over obstructions or dropped into depressions in the field and enabling better work with little exertion on the part of the operator, while at the same time the power of the horses may be utilized in lifting the loaded teeth from the ground whenever necessary.

The invention consists in the novel construction of parts and devices and in the novel combination of parts and devices hereinafter set forth, and illustrated in the accompanying drawings.

In the accompanying drawings, which form a part of this specification, Figure 1 is a perspective of that part of the machine to which my invention is applied, and Fig. 2 is a central longitudinal section.

In said drawings, 5 5 represent the longitudinal push-bars, connected at their rear ends by a cross-beam 6 and near their ends by another cross-beam 7. The driver's seat 8 is attached to the rear cross-bar. The push-bars and the cross-beams form a rigid frame, and pivoted upon the push-bars near their rear ends are draft-bars 9 9. These draft-bars are independent of each other, and each of the draft-bars is independently pivoted upon one of the push-bars.

10 represents the hooks by which the horses may be attached to the draft-bars.

The lifting-rods by which the rake is lifted are shown at 11 11, and they are pivotally joined to the hand-lever 12, pivoted at its lower end upon pivots 13, passing through the arms of a U-shaped metal frame 14, bolted to the cross-beam 7. The lower end of this lever is forked, as plainly shown in Fig. 1, to give room to one of the other parts.

15 and 16 are foot-cranks arranged at right angles to each other, so that when one crank is depressed the other one will be raised, and they are given bearings in the ends of the frame 14. Connecting the pivotal ends of the two foot-cranks is a crank-frame 17, each end of which is rigidly joined to one of the foot-cranks and the connecting or transverse member of which lies transversely of and in front of the forked end of the hand-lever 12, the limbs of the crank being outside of the lever, so that it is adapted when raised to bear against the lever. This crank-frame is normally in the position shown at Fig. 1, and in that position it has no effect upon the lever, which is free to be moved by hand in the usual manner. A rod 18 is looped around the transverse or outer member of the crank-frame and passes backward between the limbs of the lever-fork and effects a junction with two short links 20 20, which are hooked to the inner ends of the draft-bars 9, one to each. The rod 18 is preferably provided with an eye 19 and the links 20 with eyes engaging said eye 19.

In the normal position (shown in full lines in the drawings) the crank-frame is held from downward movement by the contact of the foot-crank 16 with the cross-beam 7, and the line of the draft, it will be seen, is below the axis upon which the crank-frame 17 swings, so that the power of the draft is transmitted through the links 20, rod 18, and crank-frame 17 to the casting 14 and is without effect on the hand-lever, which remains free to be manipulated as needed to raise the teeth over obstructions or to drop them into depressions in the field; but when the load has been gathered the driver in order to raise it reverses the crank-frame 17 to the position given in dotted lines by means of the foot-crank 15, so as to carry the line of draft above the axis of the crank-frame, and thereby to draw the crank-frame against the forked end of the lever 12. This results in the forcing of the lever to the position given in dotted lines, and the power of the draft will thereafter be constant in holding the lever in that position as long as desired, thereby relieving the driver from the necessity of holding the lever while hauling the load to the point of discharge. The driver may assist in the lifting operation above described by taking hold of the lever. To release the lever from the draft, it is only necessary for the driver to press upon the foot-crank 16, and thereby return the crank 17 back to its normal position. The lever will then return automatically under the weight of the load, or if no load is upon the rake it may be returned by hand.

Although the construction shown is the best now known to me, it will be understood that I do not wish to be limited thereto, as obviously the construction may be considerably varied without departing from the invention.

I claim—

1. The combination with the rake-head, the operating-lever for lifting the rake-head, the devices connecting the lever to the head, and the draft devices, of a vertically-swinging crank connected to the draft devices and bearing against said lever.

2. The combination with the rake-head, the lever for lifting the rake-head, the devices connecting the lever to the head, and the draft devices, of a vertically-swinging frame connected to the draft devices and normally positioned so that the line of draft is below the axis upon which the frame swings, means whereby the frame may be so positioned as to throw the draft above its axis, a crank 16 rigid with the frame and a stop limiting the movement of said crank.

3. The combination with the rake-head, the lever for lifting the rake-head, the devices connecting the lever to the head and the draft devices, of a crank-frame connected to the draft devices, and means for positioning said frame against the lever at will whereby the power of the draft may be transmitted to the lever.

4. The combination with the draw-bars and the lifting-lever of a push-rake, of a crank-frame connected to the draw-bars, and adapted to bear against and operate said lever, and means for moving the crank-frame into contact with the lever and for withdrawing it therefrom.

5. The combination with the draw-bars and the lifting-lever of a push-rake, of an adjustable device for operating the lever directly connected to the draw-bars, and means whereby the driver may adjust said device for operating the lever and also for releasing it.

6. The combination with the draw-bars and the lifting-lever of a push-rake, of a crank-frame for operating said lever connected to the draw-bars and adapted to bear against the lever, and a foot-lever for moving said crank-frame into contact with the lever.

FRANK R. CHILDREN.

Witnesses:
C. G. SAUNDERS,
D. E. STUART.